(12) United States Patent
Crist

(10) Patent No.: US 9,338,294 B2
(45) Date of Patent: May 10, 2016

(54) AUTOMATED TASK DEFINITIONS

(71) Applicant: Nuance Communications, Inc., Burlington, MA (US)

(72) Inventor: Sean J. Crist, Arlington, MA (US)

(73) Assignee: Nuance Communications, Inc., Burlington, MA (US)

( * ) Notice: Subject to any disclaimer, the term of this patent is extended or adjusted under 35 U.S.C. 154(b) by 105 days.

(21) Appl. No.: 14/162,014

(22) Filed: Jan. 23, 2014

(65) Prior Publication Data
US 2015/0207931 A1 Jul. 23, 2015

(51) Int. Cl.
*H04M 1/64* (2006.01)
*H04M 3/493* (2006.01)

(52) U.S. Cl.
CPC ........ *H04M 3/493* (2013.01); *H04M 2203/355* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,027,384 A * | 6/1991 | Morganstein | ......... | H04M 3/436 379/207.05 |
| 5,222,125 A * | 6/1993 | Creswell | ............. | H04M 3/4228 379/114.05 |
| 5,864,605 A * | 1/1999 | Keshav | ....................... | 379/88.01 |
| 6,731,724 B2 * | 5/2004 | Wesemann et al. | ........ | 379/88.16 |
| 6,873,693 B1 * | 3/2005 | Langseth | ................ | G06Q 10/10 379/201.01 |
| 7,590,224 B1 * | 9/2009 | Gorin et al. | ................. | 379/88.13 |
| 8,130,918 B1 * | 3/2012 | Zirngibl | ............ | H04M 3/42153 379/69 |
| 8,607,138 B2 * | 12/2013 | Harold | .............. | G06F 17/30554 707/609 |

OTHER PUBLICATIONS http://en.wikipedia.org/wiki/Kernighan%E2%80%93Lin_algorithm "Kernighan-Lin algorithm", retrieved from Internet Jan. 22, 2014.

* cited by examiner

*Primary Examiner* — Joseph T Phan
(74) *Attorney, Agent, or Firm* — Hamilton, Brook, Smith & Reynolds, P.C.

(57) ABSTRACT

Task analysis of an interactive communication system (ICS) can be performed manually. Manual task analysis is costly and time-consuming process. In an embodiment, a method of defining tasks within an ICS includes identifying hub node(s) to be marked as unavailable from consideration as nodes within a task. The at least one hub node can be within a directed graph representing flows through an ICS. The method further includes, from available nodes, automatically identifying a connected subgraph that corresponds to nodes representing an area of functionality defining a task within the ICS. The method additionally includes repeating the identifying of the connected subgraph at least one time. The method also includes outputting an indicator of the at least one hub node identified and the connected subgraphs that represent corresponding areas of functionality defining respective tasks. Therefore, task analysis is improved by extracting task definitions from the graph data automatically.

20 Claims, 12 Drawing Sheets

AUTOMATED TASK DEFINITIONS

BACKGROUND

Graphs are a collection of nodes connected by connections or arcs, and can have different properties. For example, an unconnected graph is a graph where not every node in the graph is reachable from every other node in the graph. To contrast, a connected graph is a graph where every node is reachable from any other node. In an unconnected graph, connections between nodes have no directional properties (e.g., the connections are bidirectional). In a directed graph, the connections between nodes have directional properties (e.g., each connection is for a one-way particular direction), but any two nodes can, in effect, emulate or mimic a bidirectional connection by having two connections, each connection being in a particular direction. A graph with a cycle is a graph in which a traversal path exists such that a node can be reached more than once on a walk of the graph. An acyclic graph is a graph in which no such traversal path exists.

A node (e.g., Node A) of a graph is considered "reachable" from another node (e.g., Node B) if a traversal path exists along the graph from Node B to Node A. A node (e.g., Node A) of a graph is considered "not reachable" from another node (e.g., Node B) if no traversal path exists along the graph from Node B to Node A.

Each node of a graph has an "in-degree" property and an "out-degree" property. A node's "in-degree" is the number of arcs (e.g., connections) leading into the node. A node's "out-degree" is the number of arcs (e.g., connections) leading from the node to other nodes.

A hierarchy graph (e.g., hierarchy) is a type of connected acyclic directed graph. A hierarchy has exactly one root node, which is a node with an in-degree of zero. All other nodes of the hierarchy graph have an in-degree of exactly one. A well-known example of a hierarchy is the directory structure of most computer file systems.

A breadth-first search receives a directed graph in which all of its nodes are reachable from some start node as an input and outputs a hierarchy graph as an output. The input directed graph can contain loops and other properties that are not allowable in a hierarchy. A breadth-first tree is the hierarchy produced from the breadth-first search. The breadth-first tree graph is a hierarchy directed graph that is connected with a start node, where all other nodes of the graph are reachable from the start node.

SUMMARY

In an embodiment, a method of defining tasks within an interactive communications system (ICS) includes identifying at least one hub node to be marked as unavailable from consideration as nodes within a task. The at least one hub node can be within a directed graph representing flows through an ICS. The method further includes, from available nodes, automatically identifying a connected subgraph that corresponds to nodes representing an area of functionality defining a task within the ICS. The method additionally includes repeating the identifying of the connected subgraph at least one time. The method also includes outputting an indicator of the at least one hub node identified and the connected subgraphs that represent corresponding areas of functionality defining respective tasks.

In another embodiment, the method identifies at least zero hub nodes to be marked as unavailable from consideration as nodes within the task. A "hub node" is a node with an in-degree of a configurable number or higher. An in-degree is the number of incoming connections/arcs to the particular node (that node from the other nodes).

In an embodiment, identifying the connected subgraph can include computing a score of each available subgraph in the directed graph. The score can be based on depth of a start node of the subgraph within the directed graph (i.e., the distance from the root node of the graph to the task start node) and a size of the area of functionality. The directed graph can represent flows through an ICS based on a call history by callers with the ICS or a specification of the ICS. The method can further include retrieving the call history from a log file.

In an embodiment, the method further includes enabling user input to be submitted to adjust identification of the nodes within the directed graph or finalize identification of tasks. The method additionally includes repeating the identifying based on the user input.

Each connected directed subgraph can include a start node from which all other nodes in the connected directed subgraph can be reached either directly or via nodes of the connected directed subgraph.

The method can further include converting outputted identified hub nodes and identified defined connected subgraphs to an extensible mark-up language arrangement of statements and/or a usage and flow diagram.

In an embodiment, a system for defining tasks within an interactive communications system (ICS) can include an identification module configured to identify at least one hub node to be marked as unavailable from consideration as nodes within a task. The at least one hub node can be within a directed graph representing flows through an ICS. The identification module can be further configured to, from available nodes, automatically identify a connected subgraph that corresponds to nodes representing an area of functionality defining a task within the ICS. The system can further include a looping module configured to repeat the identifying of the connected subgraph at least one time. The system can additionally include an output module configured to output an indicator of the at least one hub node identified and the connected subgraphs that represent corresponding areas of functionality defining respective tasks.

In an embodiment, a non-transitory computer-readable medium can be configured to store instructions for defining tasks within an interactive communication system (ICS). The instructions, when loaded and executed by a processor, can cause the processor to identify at least one hub node to be marked as unavailable from consideration as nodes within a task. The at least one hub node can be within a directed graph representing flows through an ICS. The instructions can further cause the process to, from available nodes, automatically identify a connected subgraph that corresponds to nodes representing an area of functionality defining a task within the ICS. The instructions can further cause the processor to repeat the identifying of the connected subgraph at least one time. The instructions can additionally cause the processor to output an indicator of the at least one hub node identified and the connected subgraphs that represent corresponding areas of functionality defining respective tasks.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Interactive voice response (IVR) menu systems can be represented as a directed connected graph. Each node of the graph represents a state, such as a menu state (e.g., a dialogue module), a database state, a play prompt state, or a decision state, and each connection between nodes represents a path the IVR can direct the user from that node to a next state, such as menu state, for example, upon a user input. The graph can further have a beginning node (e.g., a main menu node) and an exit node (e.g., a transfer to a human/IVR initiated disconnect node). For analysis, IVR menu systems can be analyzed by converting a log file of the IVR into a directed connected graph representing the IVR menu system and determining which nodes of the graph correspond to certain tasks a user may wish to perform with the IVR system.

Figure 1:
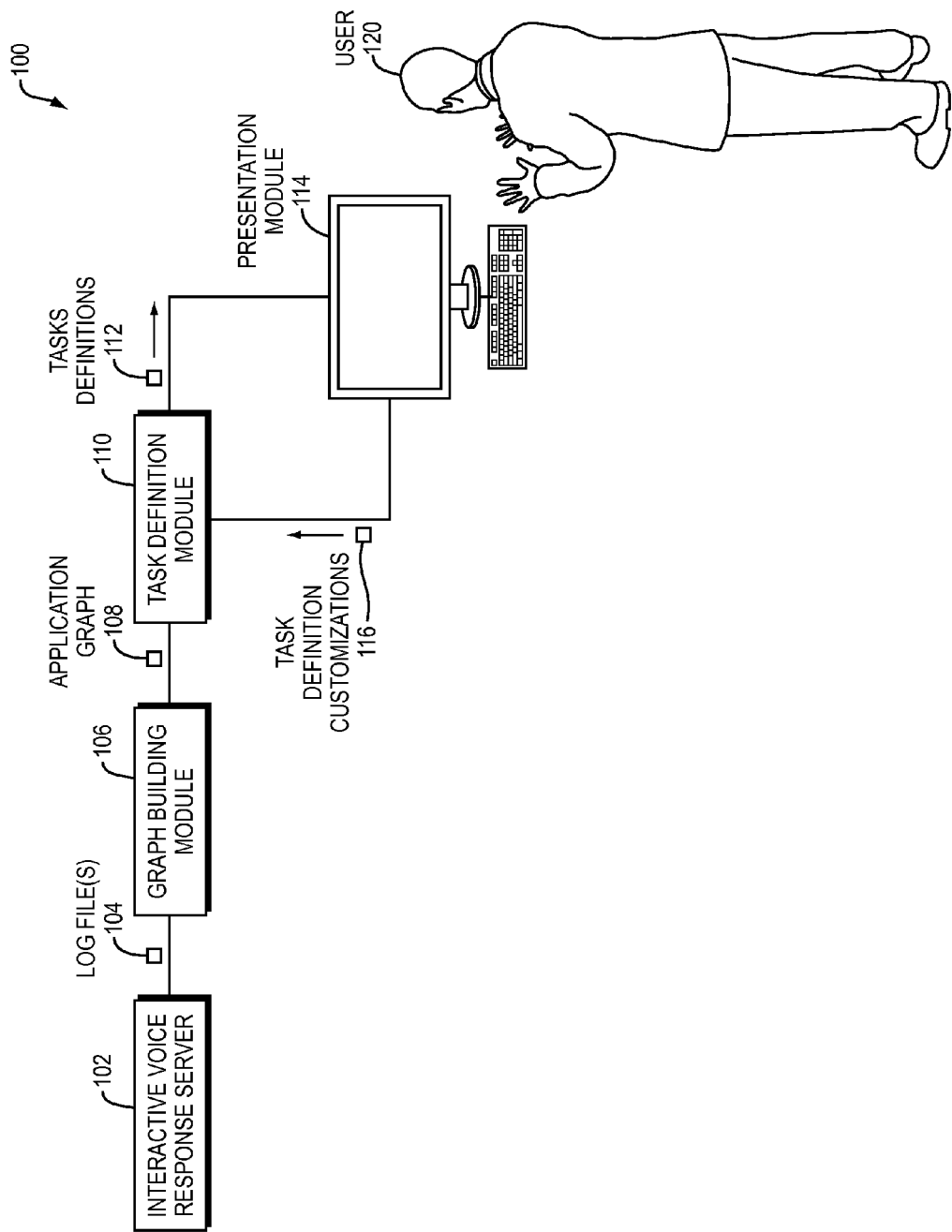
FIG. 1 is a block diagram illustrating an example embodiment of the present invention.

FIG. 1 is a block diagram 100 illustrating an example embodiment of the present invention. In an embodiment of the present invention, a system and corresponding method develops task definitions from the graph data, instead of imposing task definitions onto the graph manually. Generally, embodiments of the present system and method partition the graph of the IVR menu system into sub-graphs corresponding to tasks which a human can then define.

An IVR server 102 can forward a log file 104 to a graph building module 106. The log file 104 includes records of calls to the IVR and user navigation through a menu system thereof. The graph building module 106 then builds an application graph 108 indicative of the menu system of the IVR server 102 based on records of calls in the log file 104. The application graph 108 can be a directed connected graph.

The graph building module 106 forwards the application graph 108 to a task definition module 110. The task definition module 110 analyzes the application graph 108 using the methods described herein and outputs task definitions 112 to a presentation module 114. A user of the presentation module 114 reviews the task definitions 112, and if they are satisfactory, he can accept them. If the task definitions 112 are unacceptable, the user 120 can enter task definitions customizations 116 to the presentation module 114. The task definitions module 110 then redefines the tasks based on the application graph 108 and the task definition customizations 116 to output new task definitions 112 to the presentation module 114. The user 120 can continue to enter additional task definition customizations for plurality of iterations until the user 120 is satisfied with the task definitions 112.

Figure 2:
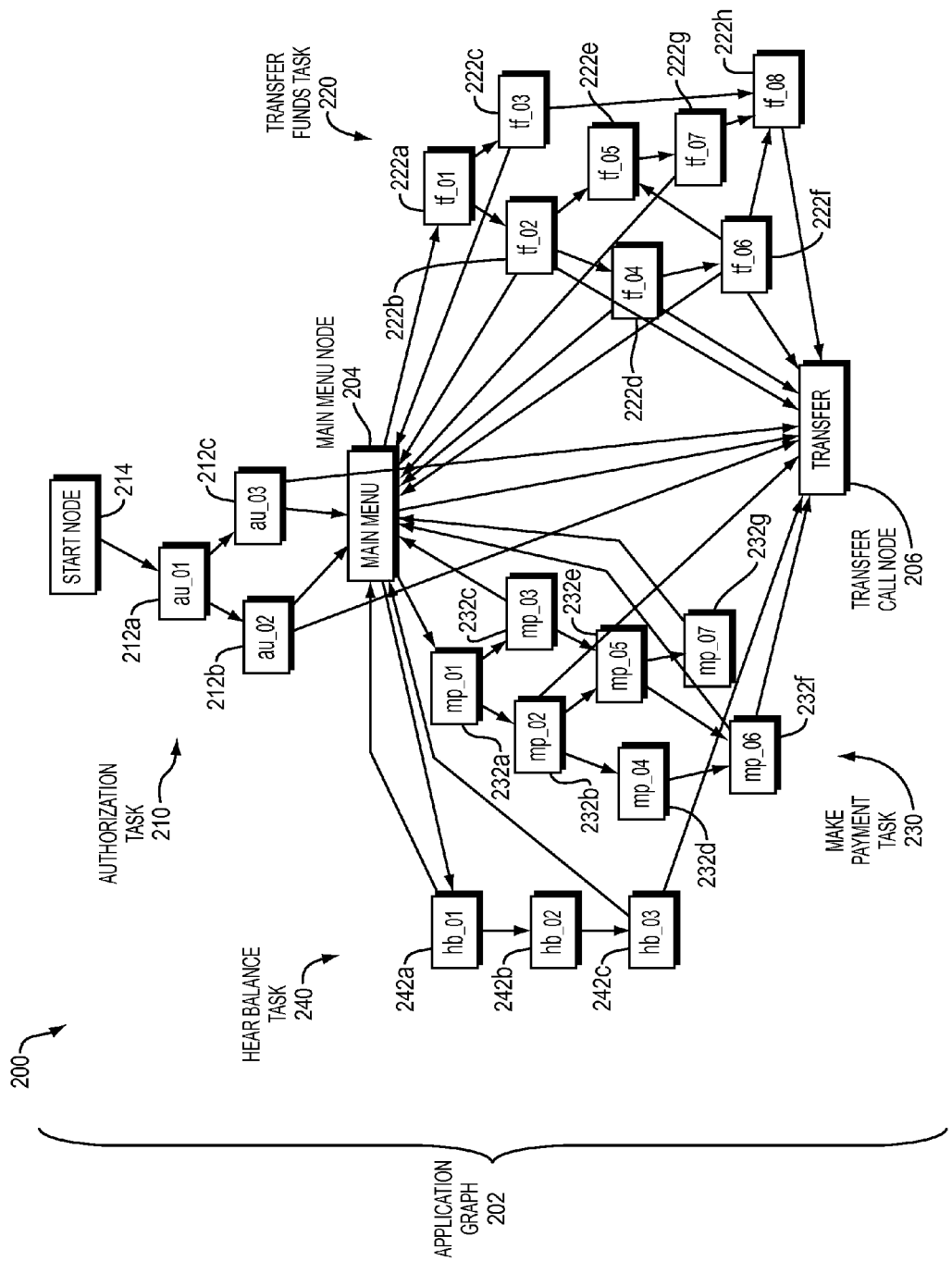
FIG. 2 is a diagram illustrating an example embodiment of an application graph.

FIG. 2 is a diagram 200 illustrating an example embodiment of an application graph 202. The application graph 202 can be derived from a log file, for example by the graph building module 106 converting log files 104 into an application graph 108, in reference to FIG. 1. Nodes 212a-c and start node 214 are part of an authorization task 210, nodes 222a-h are part of a transfer funds task 220, nodes 232a-g are part of a make payment task 230, nodes 242a-c are part of a hear balance task 240, and a main menu node 204 and a transfer call node 206 do not belong to any task graphing. This is the ideal task configuration of the application graph 202. However, a person of ordinary skill in the art can recognize that the application graph 202 alone does not include the groupings of authorization task 210, transfer funds task 220, make payment task 230, and hear balance task 240, or indications thereof, without performing analysis on the graph. Rather, based on the application graph 202 being agnostic of the authorization task 210, transfer funds task 220, make payment task 230, and hear balance task 240, the present system and method determines groupings of the task. The present system and method partitions the application graph 202 to determine the task groupings of nodes of the graph.

FIGS. 3-8 illustrate an example embodiment of the partitioning of a graph to determine tasks. Methods exist to partition graphs; however, no existing method is suited to finding sub-graphs representing tasks in a subgraph. For example, the Kernighan-Lin method partitions a graph into two sub-graphs of equal sizes, such that the number of edges connecting the two subgraphs is minimized. However, tasks can be represented in sub-graphs of various sizes, not necessarily equal sizes. Therefore, Kernighan-Lin is not suited for this application.

In social media networks that are represented by graphs, individuals can typically have around 50-250 (or more) friends, each friend belonging to a tightly clustered neighborhood. Each neighborhood can represent, for example, high school classmates, college classmates, co-workers, etc. Famous people (e.g., politicians or celebrities) can have larger networks (e.g., 100,000 or more friends) across many local neighborhoods. If the nodes with high degrees of connectedness are removed from the graph, the graph falls apart into mostly unconnected pieces. Therefore, the highly connected nodes are not informative in terms of finding sub-graphs representing meaningfully related small neighborhoods. Removing the highly connected nodes can isolate the network into meaningfully connected neighborhoods. Just as nodes in a social network can represent popular people, nodes in an IVR system can represent popular IVR states.

In the context of task definition, a defined task does not typically include a main menu, even though the main menu may be reachable from other nodes in the task that should be included (e.g., each task and multiple nodes may have a "return to main menu" option, but the task should not include the main menu node). Therefore, a "hub node" is a node with an in-degree of seven or higher. The in-degree number can be configurable to be any number; however, in embodiments, the in-degree of seven or higher is effective. A hub node therefore, can commonly be a main menu node, which typically has many in-connections for "return to main menu" options or a transfer node, which can have many in-connections for a "speak to a human" option, or any other node with a high in-degree.

Figure 3:
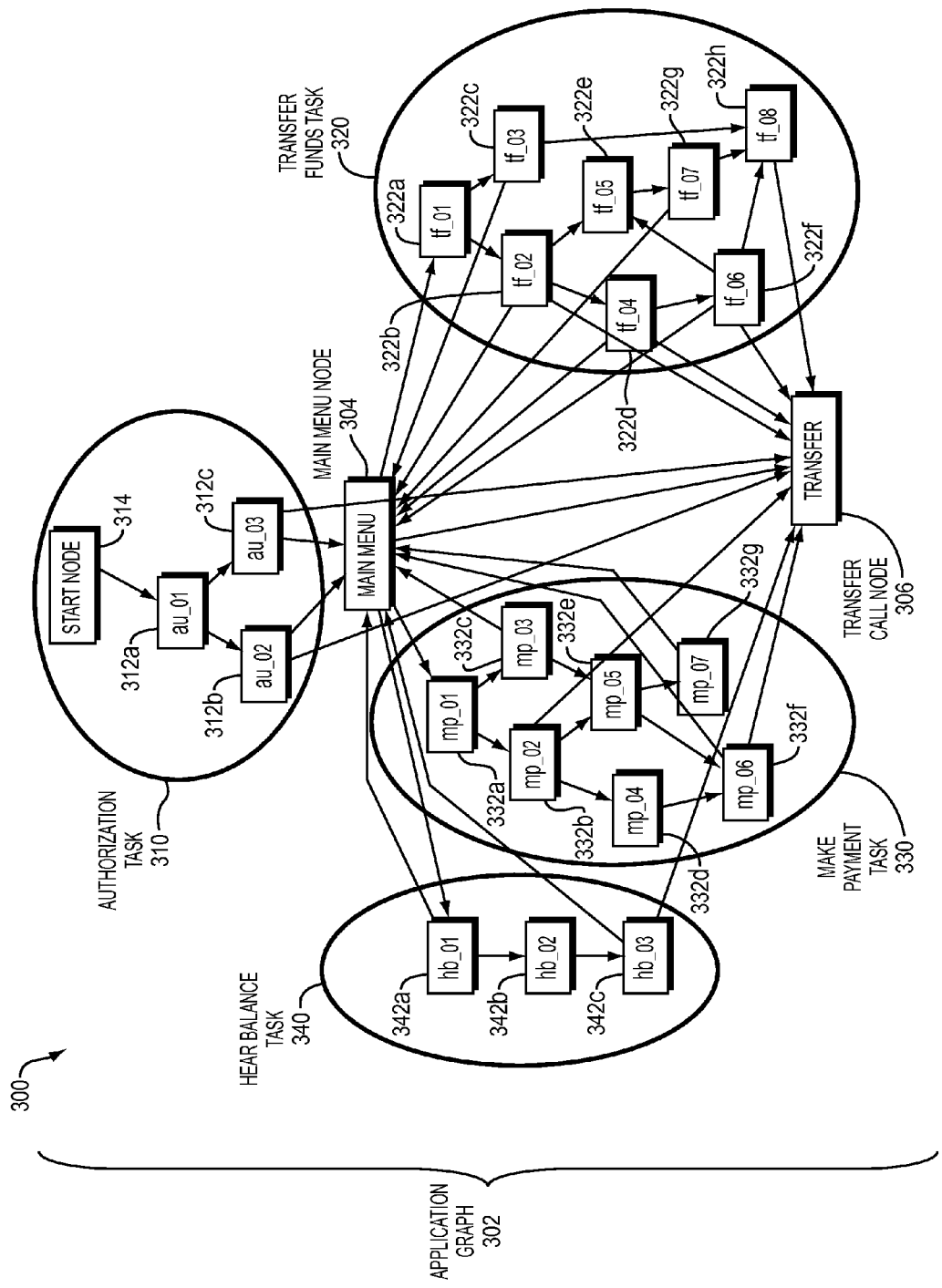
FIG. 3 is a diagram illustrating an example embodiment of an application graph in an initialization state.

FIG. 3 is a diagram 300 illustrating an example embodiment of an application graph 302 in an initialization state. Using the hub node concept, the graph partition method of an embodiment of the present invention is as follows. First, the system initializes by painting all the nodes 304, 306, 312a-c, 314, 322a-h, 332a-g, and 342a-c of the application graph 302 white, for example, by setting a property of the node to "white." Other variables or variable settings can be employed to set the property of the nodes, such as a Boolean variable.

Figure 4:
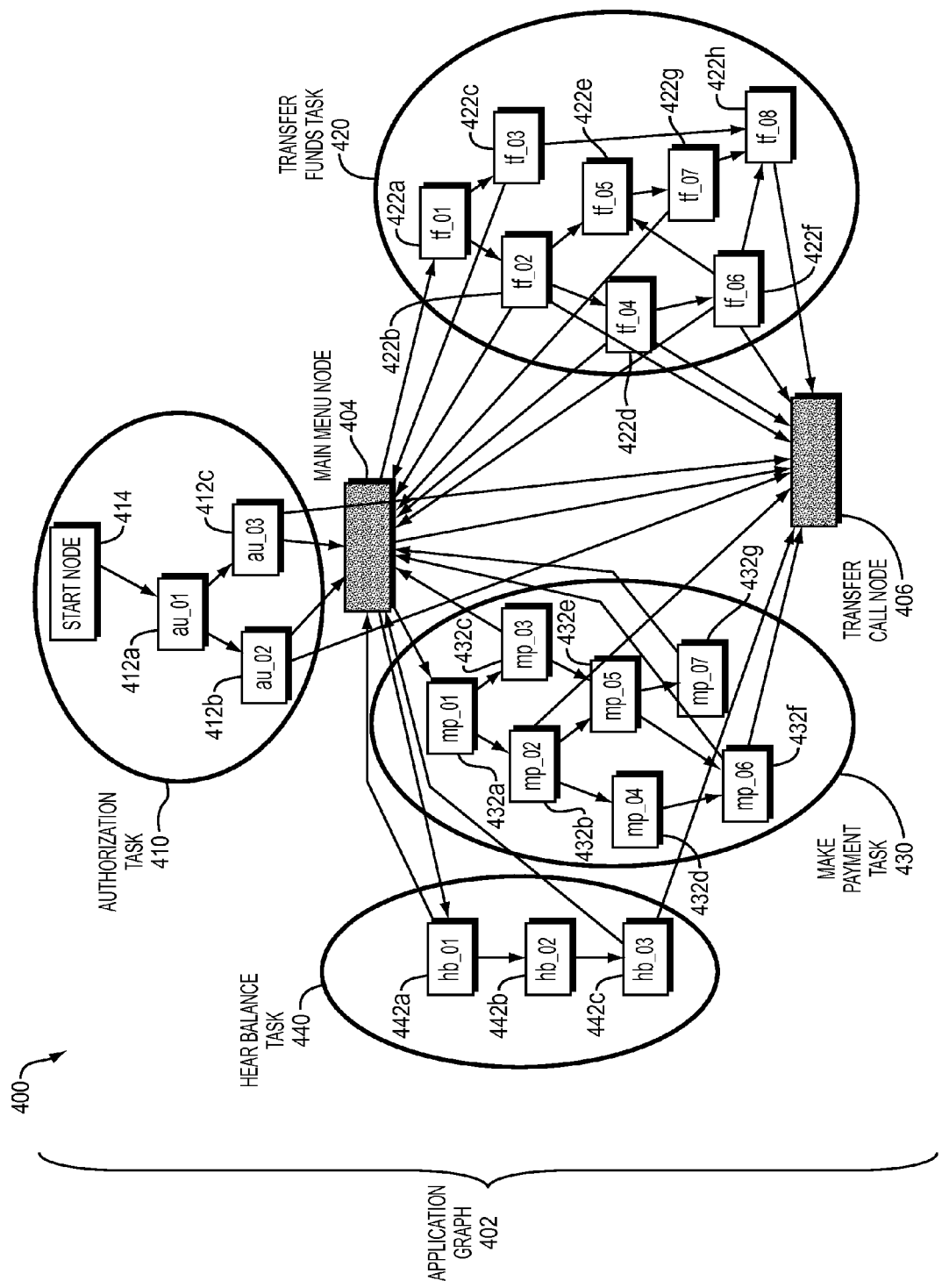
FIG. 4 is a diagram illustrating an example embodiment of an application graph after the identified hub nodes have been painted black.

FIG. 4 is a diagram 400 illustrating an example embodiment of an application graph 402. The system identifies hub nodes (e.g., main menu node 404 and transfer call node 406) in the graph and paints the hub nodes (e.g., main menu node 404 and transfer call node 406) black. The hub nodes (e.g., main menu node 404 and transfer call node 406) each have in-degrees higher than seven, which can be determined by counting the number of in-arc/connections to each respective node. A node that is painted black is not available to be added to any new task. Further, determining which nodes are reachable from a given nodes ends the search at a black node.

After determining the hub nodes and painting them black, the system then finds a candidate start node of the remaining white nodes 412a-d, 414, 422a-h, 432a-g and 442a-c. The system gives each white node 412a-d, 414, 422a-h, 432a-g and 442a-c a score based on three factors: (1) A reachability score: how many nodes are in the task; (2) depth: how deep the start node is in the graph (e.g., how far away is it from the start node); and (3) a penalty: assessing a penalty score for smaller tasks. The total score can be expressed by score=ReachabilityScore*Depth*Penalty, where a lower score is better, and the node with the best score is processed first.

In providing a sub-score for how many nodes are in the task, a target number is employed as an ideal number of nodes for the task, and if the task is greater or smaller than that number, the task is penalized by the score being increased. For example, in an embodiment, the ideal number of nodes is 15 nodes. Therefore, the sub-score for how many nodes in the task can be expressed as |Ideal Value−Size of Task|+1 or, |15−Size of Task|+1. Therefore, a size of 16 has a higher sub-score than 17, a size of 14 has a higher sub-score than 22, and a size of 13 has the same sub-score as a size of 17.

The sub-score related to depth indicates a preference for task start nodes with shallower depth over deeper depth. The depth of a node is the number of nodes which are traversed on the shortest path from the start node to the node in question. The depths of the nodes in a directed graph can be computed with a breadth-first search. The breadth-first search produces a hierarchy in which the depth of each node is implicit in the structure of the hierarchy. The sub-score related to depth indicates a preference for shallower nodes because an individual task may contain a loop, which means that there may be more than one node in a task from which all other nodes in the task are reachable. The true start node of the task is most commonly that node in the task which has the shallowest depth within the directed graph representing the totality of the application.

In providing the penalty sub-score, a penalty is assessed for small sub-graphs. By providing a penalty, shallow tasks with large breadths can be grouped as one task, instead of many individual task for each shallow branch. Therefore, the system determines a "reachability count" for each node, which is defined as "how many nodes can be reached before reaching a black node." If the reachability count is 1, the penalty is 10,000. If the reachability count is 2, the penalty is 1,000. If the reachability count is 3, the penalty is 100. If the reachability count is 4, the penalty is 10. If the reachability count is 5 or higher, the penalty is 1 (e.g., no penalty). The weights of the penalties corresponding to the reachability counts can be changed in embodiments of the system, however.

For example, node 422a has a depth of 5 from start node 414, has a reachability score of 8 based on its task size of 8 (e.g., |8−15|+1=8), and a penalty of 1 since the size of the task, determined by the number of nodes reachable from node 422a before reaching a black node is eight, and therefore greater than or equal to 5. Therefore, the score of node 422a is 5*8*1=40. A node that is not the start node of a task, such as node 422b, is still scored by the system, but always has a higher score than the start node of a task because its reachability score and penalty are the same as the start node, but its depth is at least one greater. Therefore, its score is higher and the start node is considered before the second (or greater) node in the task. Once the start node is considered, the second node is colored black as part of the task and not considered in later scorings.

As another example, node 432a has a depth of 5 from start node 414, has a reachability score of 9 based on its task size of 7 (e.g., |7−15|+1=9), and a penalty of 1 since the size of the task, determined by the number of nodes reachable from node 432a before reaching a black node is seven, and therefore greater than or equal to 5. Therefore, the score of node 432a is 5*9*1=45.

As yet another example, start node 414 has a depth of 1 from start node 414 (itself), has a reachability score of 11 based on its task size of 5 (e.g., |5−15|+1=11), and a penalty of 10 since the size of the task, determined by the number of nodes reachable from node 414 before reaching a black node is four. Therefore, the score of node 414 is 1*11*10=110.

As another example, node 442a has a depth of 5 from start node 414, has a reachability score of 13 based on its task size of 3 (e.g., |3−15|+1=13), and a penalty of 100 since the size of the task, determined by the number of nodes reachable from node 442a before reaching a black node is three. Therefore, the score of node 442a is 5*13*100=6,500.

The system defines each task and, upon completion, marks all the nodes of the task as black so they are not searched again. The system defines tasks by, for a given white node, Node X, in the graph, making Node X a start state of a new task. Then, the system finds all nodes reachable from Node X and adds them to the task. These nodes are then painted black. Therefore, based on the scores, the system defines each task starting at nodes 422a (score of 40), 432a (score of 45), 414 (score of 110), and 442a (score of 6,500), in that order.

Figure 5:
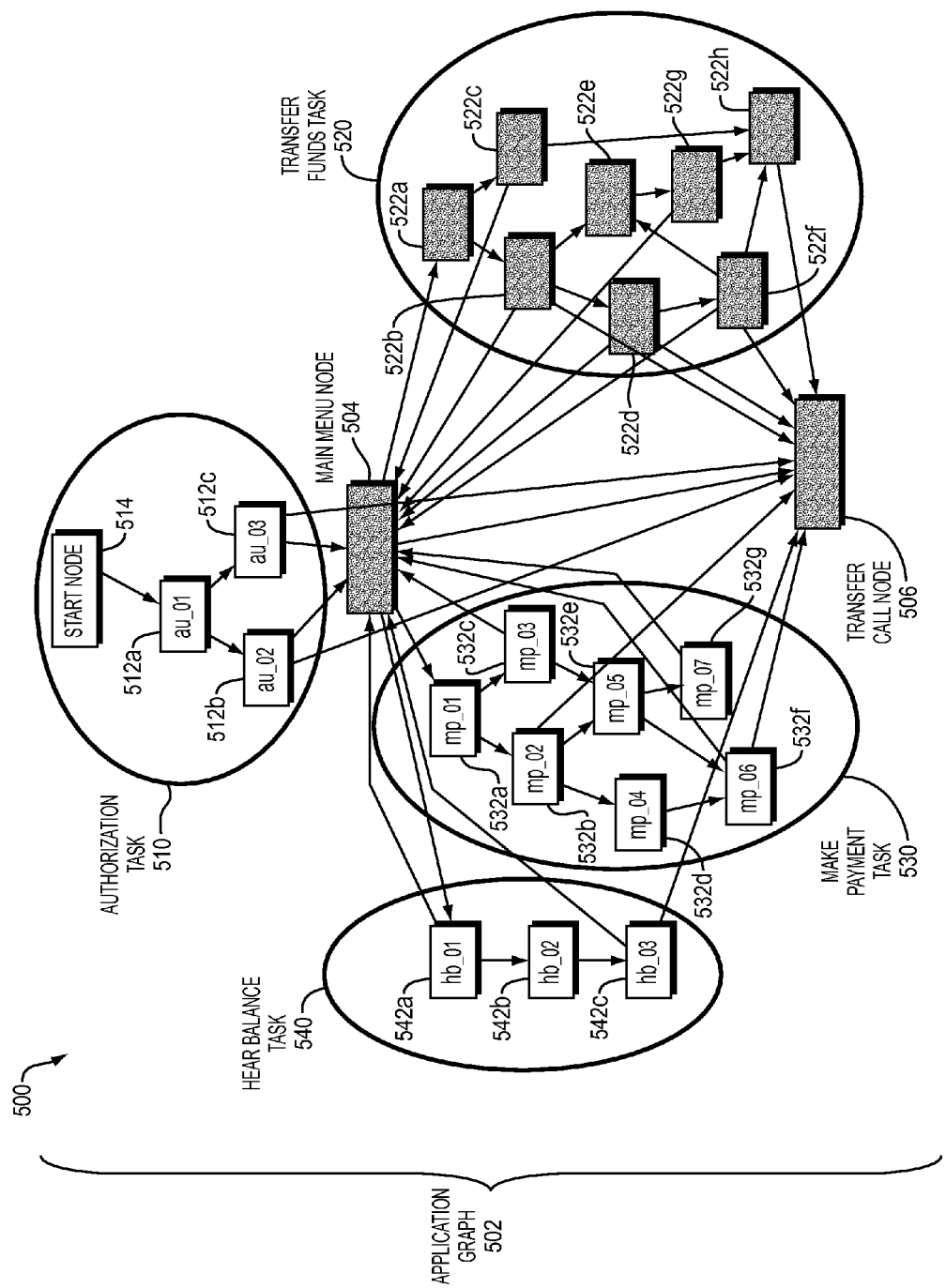
FIG. 5 is a diagram illustrating an application graph after painting nodes reachable from a first task start node black.

FIG. 5 is a diagram 500 illustrating an application graph 502 after painting nodes reachable from node 522a black. Node 522a corresponds with node 422a of FIG. 4, has the lowest score of all the nodes, and therefore is processed first. The system walks all nodes reachable from 522a and paints the nodes 522a-h black as it walks until no white nodes are reachable.

Figure 6:
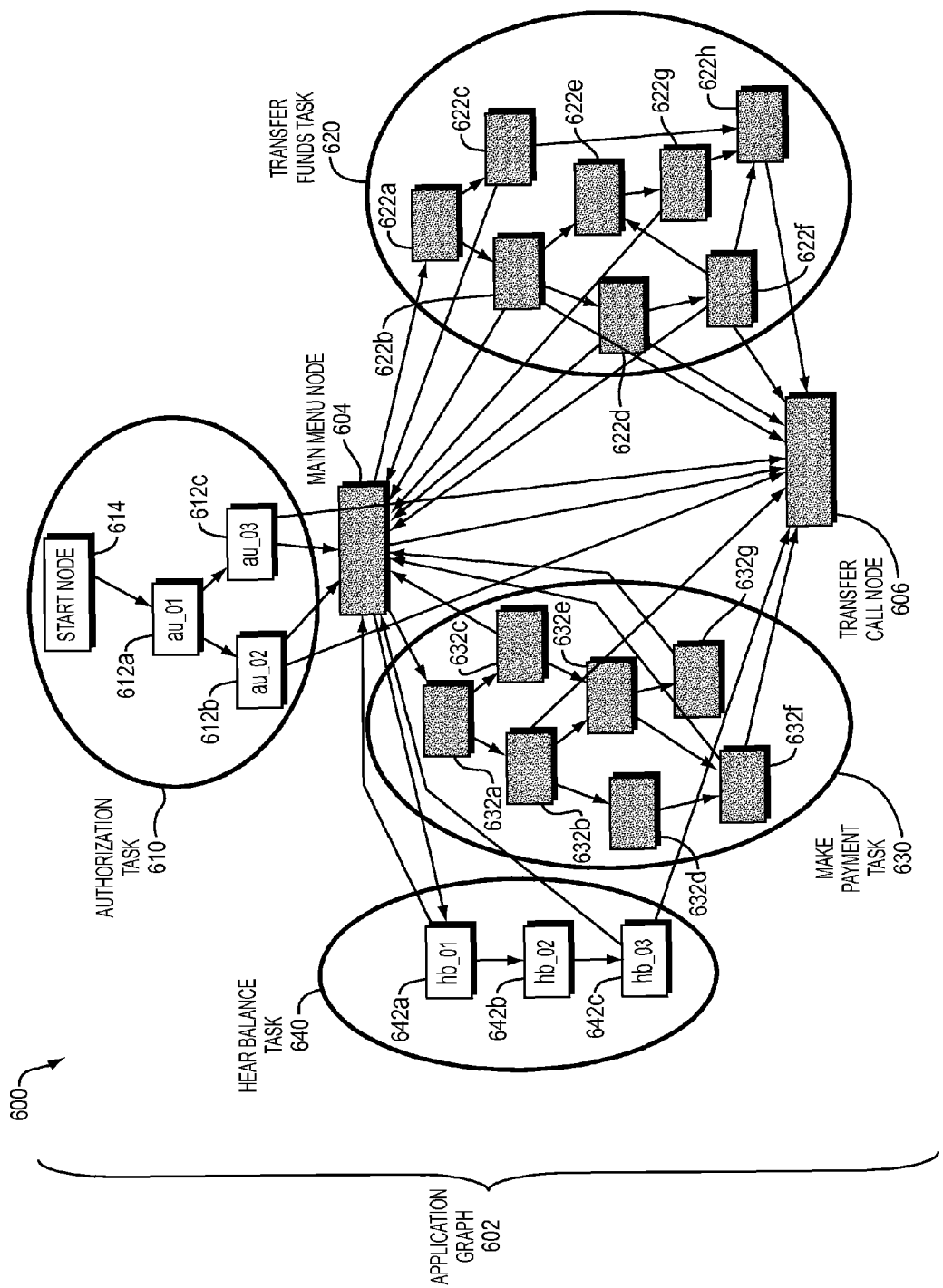
FIG. 6 is a diagram illustrating an application graph after painting nodes reachable from a second task start node black.

FIG. 6 is a diagram 600 illustrating an application graph 602 after painting nodes reachable from node 632a black. Node 632a corresponds with node 432a of FIG. 4, has the lowest remaining score of all the white nodes since nodes 622a-h (corresponding with node 522a-h) are colored black, and therefore is processed next. The system walks all nodes reachable from 632a and paints the nodes 632a-f black as it walks until no white nodes are reachable.

Figure 7:
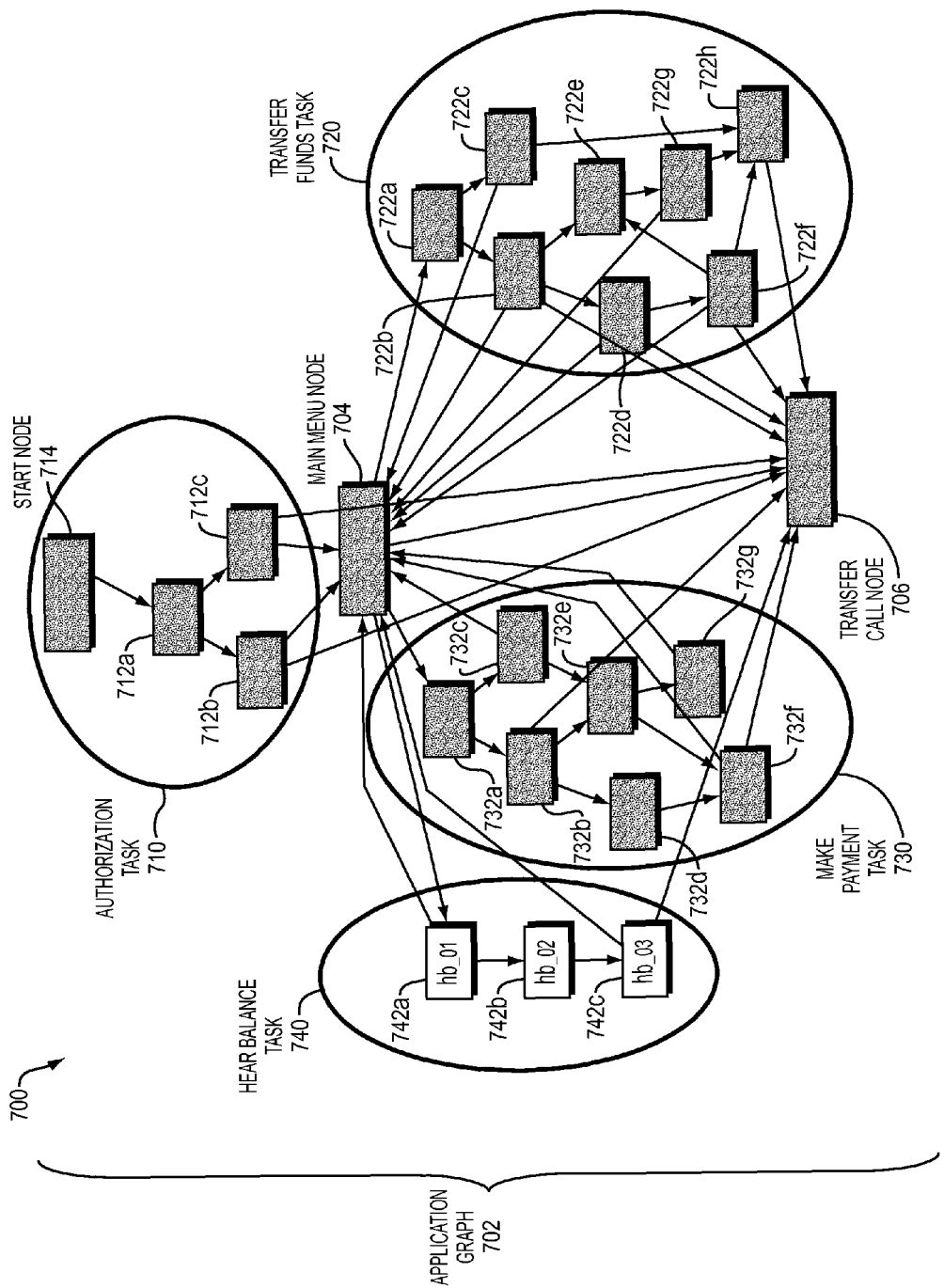
FIG. 7 is a diagram illustrating an application graph after painting nodes reachable from a third task start node black.

FIG. 7 is a diagram 700 illustrating an application graph 702 after painting nodes reachable from node 714 black.

Node 714 corresponds with node 414 of FIG. 4, has the lowest remaining score of all the white nodes since nodes 722*a-h* (corresponding with node 522*a-h*) and nodes 732*a-g* (corresponding with nodes 632*a-g*) are colored black, and therefore is processed next. The system walks all nodes reachable from 714 and paints the nodes 714 and 714*a-c* black as it walks until no white nodes are reachable.

Figure 8:
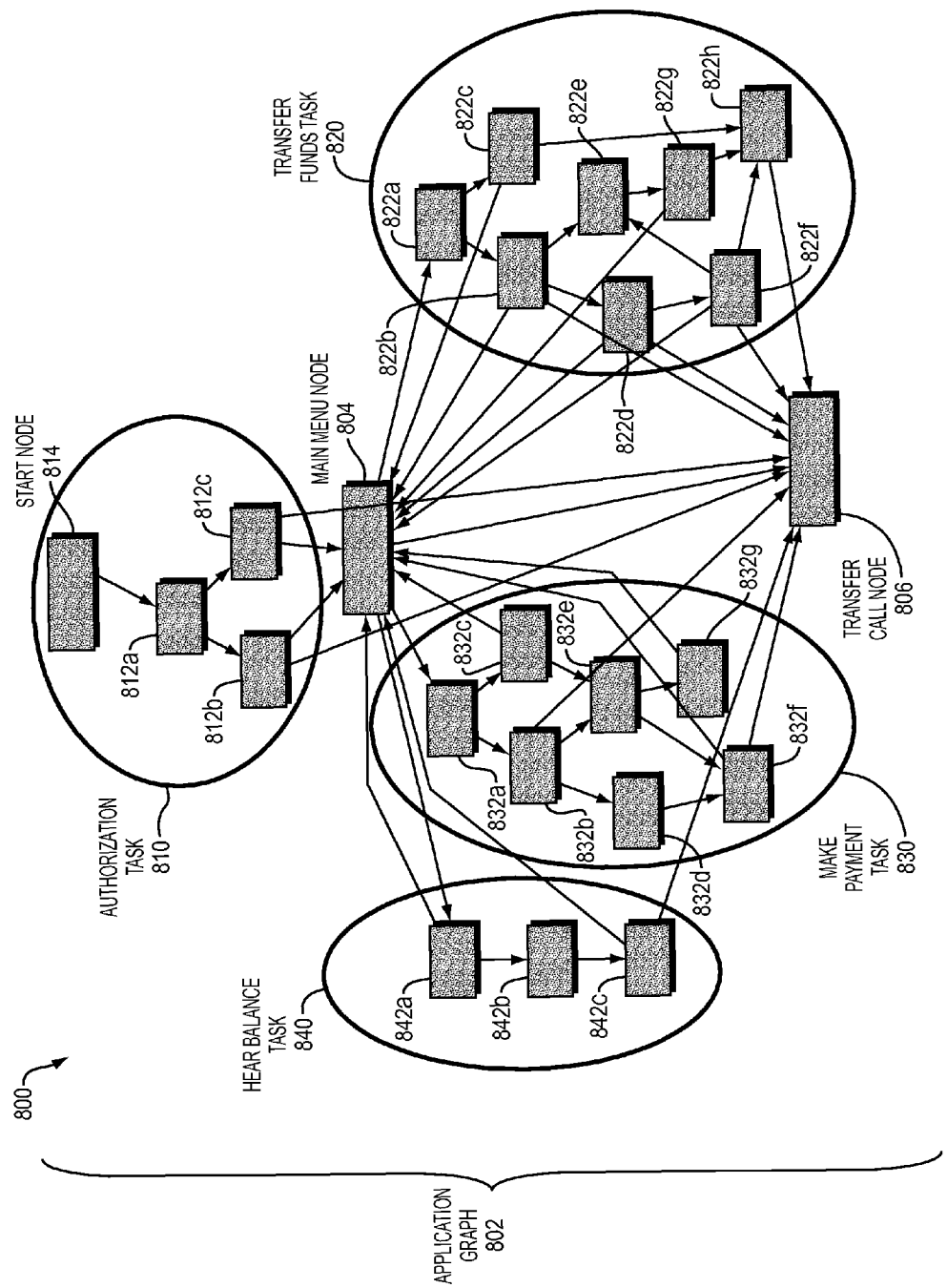
FIG. 8 is a diagram illustrating an application graph after painting nodes reachable from a fourth task start node black.

FIG. 8 is a diagram 600 illustrating an application graph 802 after painting nodes reachable from node 842*a* black. Node 842*a* corresponds with node 442*a* of FIG. 4, has the lowest remaining score of all the white nodes because nodes 822*a-h* (corresponding with node 522*a-h*), nodes 832*a-g* (corresponding with nodes 632*a-g*), start node 814 and nodes 812*a-c* (corresponding to start node 714 and nodes 712*a-c*) are colored black, and therefore is processed next. The system walks all nodes reachable from 842*a* and paints the nodes 842*a-c* black as it walks until no white nodes are reachable.

For the initial automatic task definitions, the system (e.g., task definition module 110 of FIG. 1) receives an arc list of the application graph 108. After the first run, the system outputs a list of hub nodes and task definitions (e.g., task definitions 112 of FIG. 1) and a blueprint file. The user can then edit the blueprint file to adjust the processing of the application graph 108. The system can then receive both the user-modified blueprint file and the arc list of the application graph 108 and reprocess the graph based on the user's instructions. An example of editing the blueprint file is including a command to paint a particular node white or black at a different time than the system determined. A user may want to manually paint a node black, for example, if it is part of a small task that is hard to process.

Figure 9:
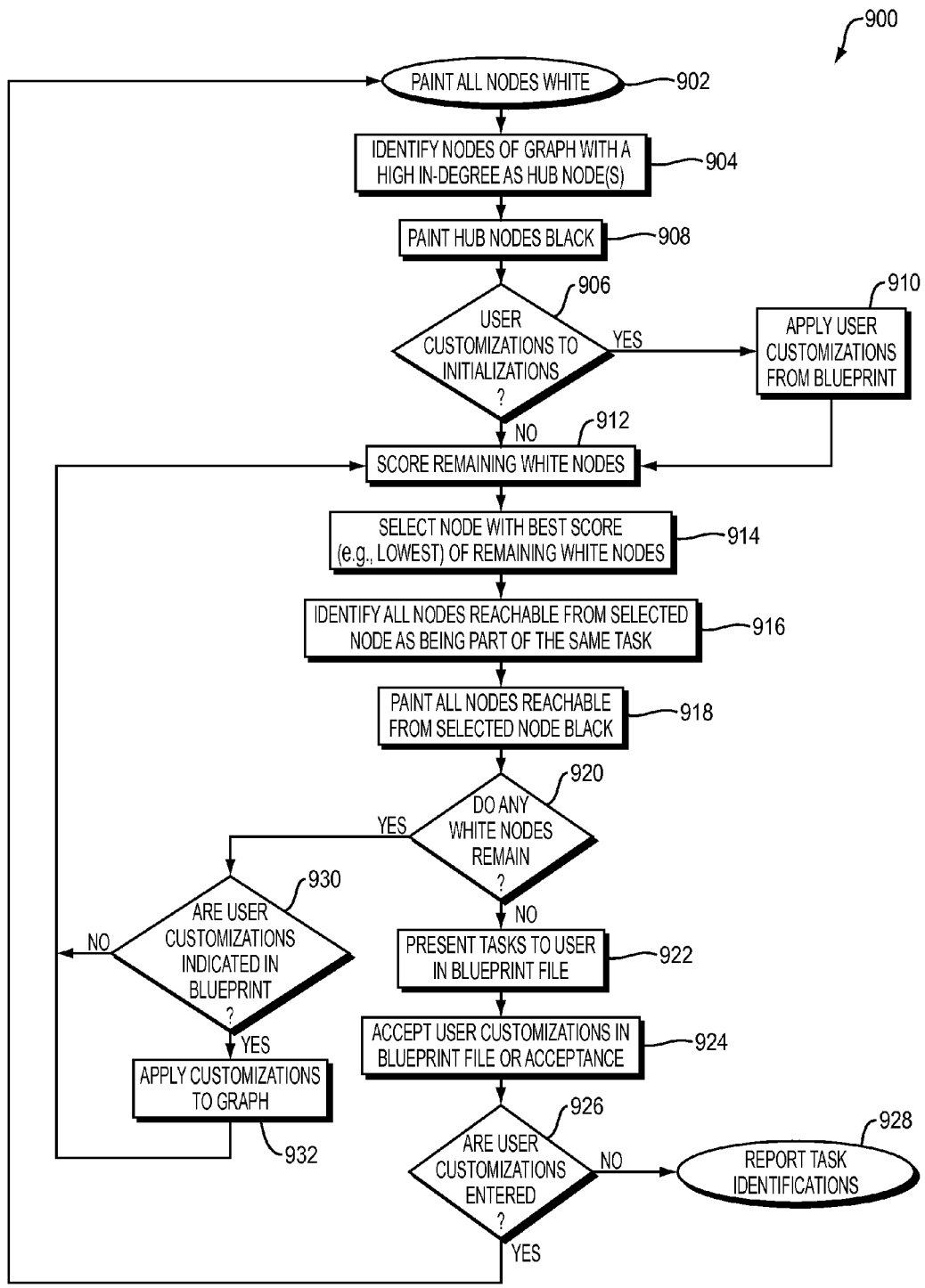
FIG. 9 is a flow diagram illustrating an example embodiment of the present invention.

FIG. 9 is a flow diagram 900 illustrating an example embodiment of a process employed by the present invention. The process begins by painting all nodes of an application graph white (902). The process then identifies nodes of the application graph with a high in-degree as hub node(s) (904). A high in-degree of a given node is number of arcs or connections above a given threshold directed towards the given node. In an embodiment, the given threshold is seven or higher. The process then paints the hub nodes black (908).

The process then determines whether user customizations in a blueprint file have been directed to the initialization (906). User customizations are not typically applied during the first time processing an application graph, but are added by a user after the first run (e.g., see 924 of FIG. 9). A customization to the initialization can include marking a particular node as a hub node or excluding a node from being marked as a hub node. If a customization is made, the process applies the user customizations from the blueprint to the graph, for example, by painting a node as white or black as indicated in the blueprint file (910).

If no customization is indicated (906), the process scores the remaining white nodes (912). Then, the process selects the node with the best score, which in one embodiment is the lowest score, of the remaining white nodes (914). Then, the process identifies all nodes reachable from the selected node as being part of the same task (916). The process then paints all nodes reachable from the selected node (e.g., nodes of the identified task) black (918).

The process then determines if any white nodes remain in the graph (920). If so, the system determines if any user customizations are indicated in the blueprint for this point of processing the graph (930). If so, the process applies the customizations to the graph (932). The customizations can include including additional nodes in the identified task by painting the nodes black or excluding nodes from the task by painting them white. The process scores remaining white nodes (912).

If no white nodes remain (920), then the process presents the identified task to the user in a blueprint file (922). The process can then accept user entered customizations in a blueprint file or user acceptance of the task (924). If user customizations are entered (926), the process re-processes the graph applying the customizations, starting by painting all nodes white (902). If the user accepts the identified tasks (926), the process reports the task identifications (928). From there, the user can give each identified task a name and produce additional analytics about the ICS system.

Figure 10:
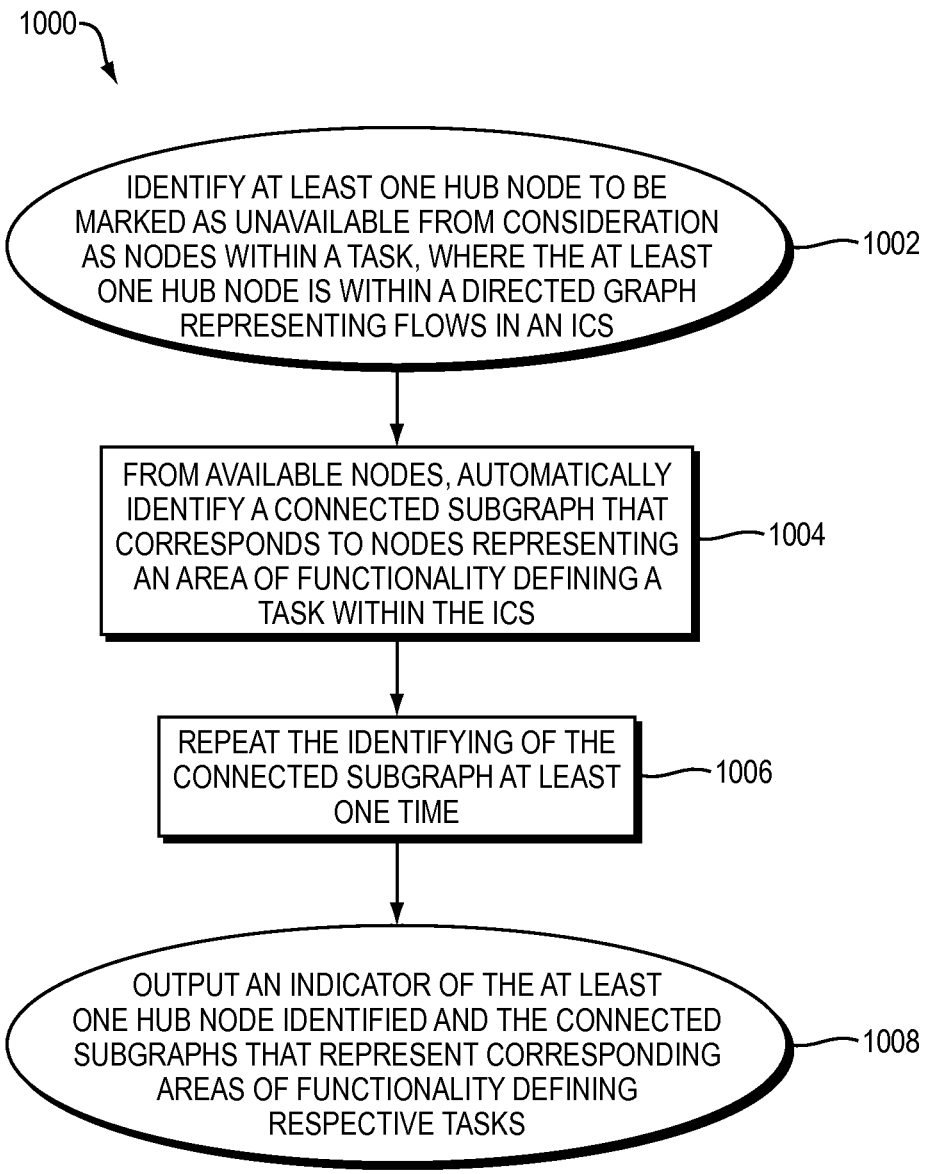
FIG. 10 is a flow diagram illustrating an example embodiment of a process employed by the present invention.

FIG. 10 is a flow diagram 1000 illustrating an example embodiment of a process employed by the present invention. The process begins by identifying at least one hub node to be marked as unavailable from consideration as nodes within a task (1002). The hub node(s) are within a directed graph representing flows in an ICS. Then, from available hub nodes, the system automatically identifies a connected subgraph that corresponds to nodes representing an area of functionality defining a task within the ICS (1004). Then, the process repeats the identifying of the connected subgraph at least one time (1006). Then, the process outputs an indicator of the at least one hub node identified and the connected subgraphs that represent corresponding areas of functionality defining respective tasks (1008).

Figure 11:
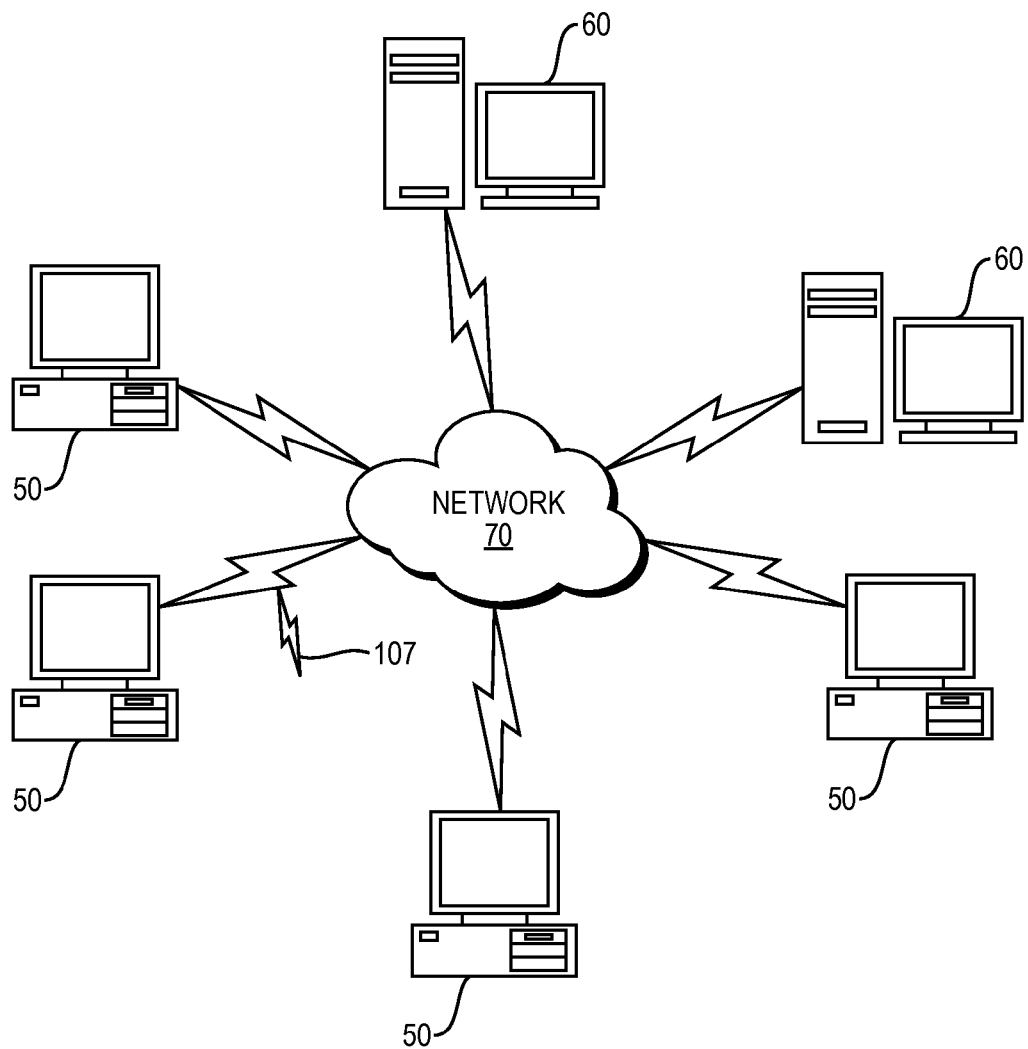
FIG. 11 illustrates a computer network or similar digital processing environment in which embodiments of the present invention may be implemented.

FIG. 11 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 12:
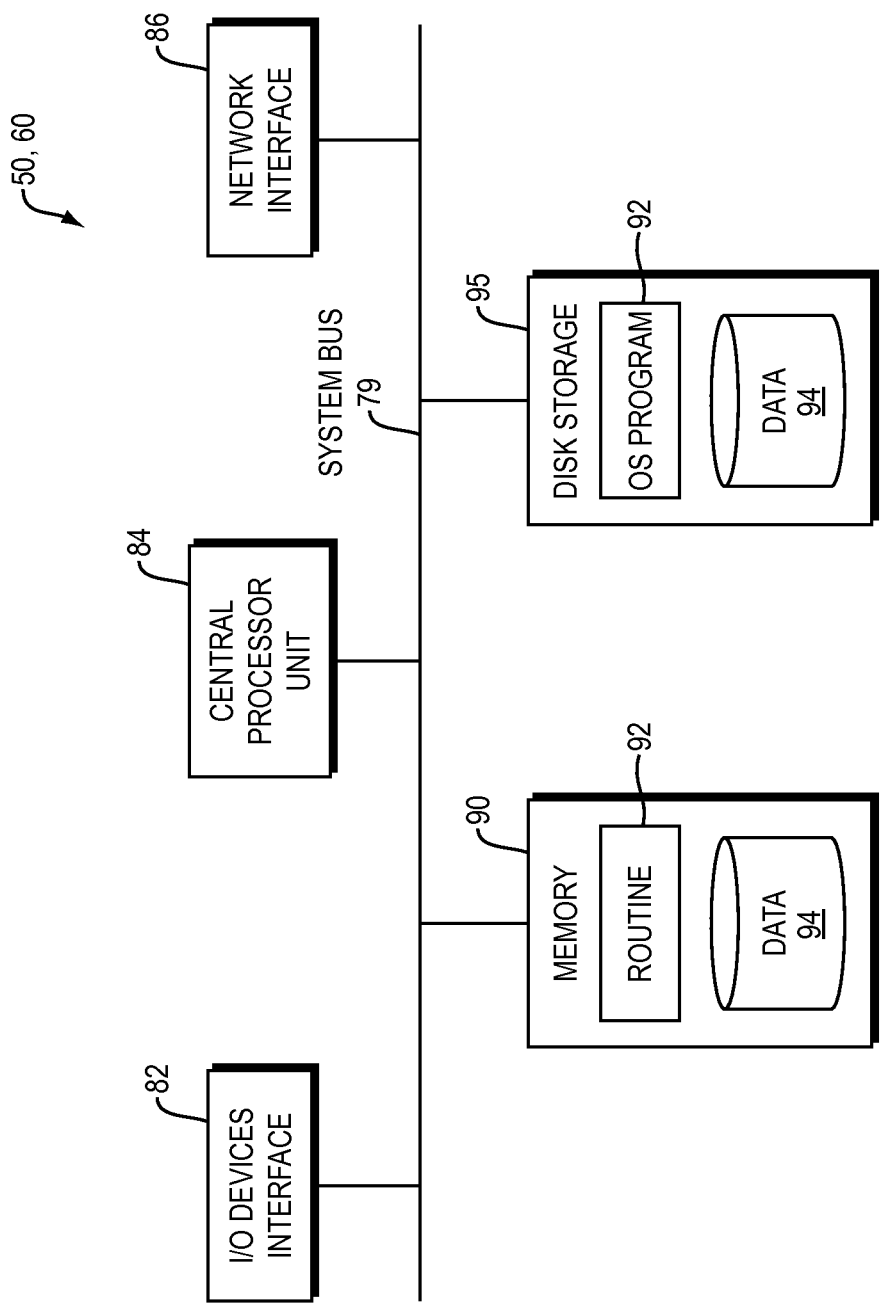
FIG. 12 is a diagram of an example internal structure of a computer (e.g., client processor/device or server computers) in the computer system of FIG. 11.

FIG. 12 is a diagram of an example internal structure of a computer (e.g., client processor/device 50 or server computers 60) in the computer system of FIG. 11. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 10). Memory 90 provides volatile storage for computer software instructions 92 and data 94 used to implement an embodiment of the present invention (e.g., selection module, presentation module and labeling module code detailed above). Disk storage 95 provides non-volatile storage for computer software instructions 92 and data 94 used to implement an embodiment of the present invention. A central processor unit 84 is also attached to the system bus 79 and provides for the execution of computer instructions. The disk storage 95 or memory 90 can provide storage for a database. Embodiments of a database can include a SQL database, text file, or other organized collection of data.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of defining tasks within an interactive communication system (ICS), the method comprising:
    identifying at least one hub node to be marked as unavailable from consideration as nodes within a task, the at least one hub node being within a directed graph representing flows through an ICS;
    from available nodes, automatically identifying a connected subgraph that corresponds to nodes representing an area of functionality defining a task within the ICS;
    repeating the identifying of the connected subgraph at least one time; and
    outputting an indicator of the at least one hub node identified and the connected subgraphs that represent corresponding areas of functionality defining respective tasks.

2. The method of claim 1, wherein identifying the connected subgraph includes computing a score of each available subgraph in the directed graph.

3. The method of claim 2, wherein the score is based on depth of a start node of the subgraph within the directed graph and a size of the area of functionality.

4. The method of claim 1, wherein the directed graph represents flows through an ICS based on a call history by callers with the ICS or a specification of the ICS.

5. The method of claim 4, further comprising retrieving the call history from a log file.

6. The method of claim 1, further comprising:
    enabling user input to be submitted to adjust identification of the nodes within the directed graph or finalize identification of tasks; and
    repeating the identifying based on the user input.

7. The method of claim 1, wherein each connected directed subgraph includes a start node from which all other nodes in the connected directed subgraph can be reached either directly or via nodes of the connected directed subgraph.

8. The method of claim 1, further comprising converting outputted identified hub nodes and identified defined connected subgraphs to at least one of the following: extensible mark-up language arrangement of statements or a usage and flow diagram.

9. A system for defining tasks within an interactive communication system (ICS), the system comprising:
    an identification module configured to identify at least one hub node to be marked as unavailable from consideration as nodes within a task, the at least one hub node being within a directed graph representing flows through an ICS and further configured to, from available nodes, automatically identify a connected subgraph that corresponds to nodes representing an area of functionality defining a task within the ICS;
    a looping module configured to repeat the identifying of the connected subgraph at least one time; and
    an output module configured to output an indicator of the at least one hub nodes identified and the connected subgraphs which represent corresponding areas of functionality defining respective tasks.

10. The system of claim 9, wherein the identification module is further configured to compute a score of each available subgraph in the directed graph.

11. The system of claim 10, wherein the score is based on depth of a start node of the subgraph within the directed graph and a size of the area of functionality.

12. The system of claim 9, wherein the directed graph represents flows through an ICS based on a call history by callers with the ICS or a specification of the ICS.

13. The system of claim 12, further comprising an extraction module configured to retrieve the call history from a log file.

14. The system of claim 9, further comprising:
    a user input module configured to enable user input to be submitted to adjust identification of the nodes within the directed graph or finalize identification of tasks; and
    wherein the loop module is configured to repeat the identifying based on the user input.

15. The system of claim 9, wherein each connected directed subgraph includes a start node from which all other nodes in the connected directed subgraph can be reached either directly or via nodes of the connected directed subgraph.

16. The system of claim 9, further comprising a conversion module configured to convert outputted identified hub nodes and identified defined connected subgraphs to at least one of the following: an extensible mark-up language arrangement of statements or a usage and flow diagram.

17. A non-transitory computer-readable medium configured to store instructions for defining tasks within an interactive communication system (ICS), the instructions, when loaded and executed by a processor, causes the processor to:
    identify at least one hub node to be marked as unavailable from consideration as nodes within a task, the at least one hub node being within a directed graph representing flows through an ICS;
    from available nodes, automatically identify a connected subgraph that corresponds to nodes representing an area of functionality defining a task within the ICS;
    repeat the identifying of the connected subgraph at least one time; and
    output an indicator of the at least one hub node identified and the connected subgraphs that represent corresponding areas of functionality defining respective tasks.

18. The non-transitory computer-readable medium of claim 17, wherein identifying the connected subgraph includes computing a score of each available subgraph in the directed graph.

19. The non-transitory computer-readable medium of claim 18, wherein the score is based on depth of a start node of the subgraph within the directed graph and a size of the area of functionality.

20. The non-transitory computer-readable medium of claim 17, wherein the directed graph represents flows through an ICS based on a call history by callers with the ICS or a specification of the ICS.

* * * * *